(12) United States Patent
Jang et al.

(10) Patent No.: US 6,184,987 B1
(45) Date of Patent: Feb. 6, 2001

(54) PROCESS FOR DETECTING AND CORRECTING A MISALIGNMENT BETWEEN A FIBER CABLE AND A LIGHT SOURCE WITHIN A FIBER MODULE

(75) Inventors: Soon Jang, Mission Viejo; Randy Heyler, Newport Beach, both of CA (US)

(73) Assignee: Newport Corporation, Irvine, CA (US)

( * ) Notice: Under 35 U.S.C. 154(b), the term of this patent shall be extended for 0 days.

(21) Appl. No.: 09/223,661

(22) Filed: Dec. 30, 1998

(51) Int. Cl.[7] ................................................... G01B 11/00
(52) U.S. Cl. .............................................................. 356/388
(58) Field of Search ..................................... 356/388, 394, 356/230

(56) References Cited

U.S. PATENT DOCUMENTS

5,963,695 10/1999 Joyce .

Primary Examiner—Frank G. Font
Assistant Examiner—Reginald A. Ratliff
(74) Attorney, Agent, or Firm—Irell & Manella LLP (57) ABSTRACT

A process for laser welding a ferrule of a fiber optic cable to a clip of a fiber module. The process can detect and correct a movement of the fiber optic cable so that the fiber is aligned with a light source such as a laser diode. The detection method includes the steps of mechanically moving the ferrule with an automated device after a weld is completed and then detecting a change in optical power of a light beam that is transmitted through the fiber optic cable. The detection can determine a direction that the ferrule shifted during the weld process. The shift of the ferrule can be corrected by subsequent laser welds of the ferrule and clip. The power and time duration of the laser welds can be determined from an empirically derived look-up table. The entire process of detection and correction can be automated.

28 Claims, 8 Drawing Sheets

PROCESS FOR DETECTING AND CORRECTING A MISALIGNMENT BETWEEN A FIBER CABLE AND A LIGHT SOURCE WITHIN A FIBER MODULE

BACKGROUND OF THE INVENTION

1. Field of the Invention

The present invention relates to a fiber optic module and a method for making the module.

2. Background Information

Fiber optic cables have been developed as a medium to transfer information within a communication system. The fibers are linked to optical transmitters and optical receivers. The transmitters typically include electronic circuits that drive a light source such as a laser diode. The laser diode emits a modulated light beam that travels through the fiber optic cable to a photodetector.

It is critical to accurately align the fiber cable with the laser diode to minimize optical power losses. There have been developed numerous fiber optic modules that package the laser diode and fiber cable in a manner to align the cable to the diode. By way of example, U.S. Pat. No. 5,619,609 issued to Pan et al. and assigned to E-Tek Dynamics, Inc., discloses a fiber optic module which includes a clip that is used to align the fiber optic cable with a laser diode. The clip is mounted to a substrate and laser welded to a ferrule of the fiber optic cable. The clip has an oversized channel which allows the fiber optic cable to be vertically adjusted relative to the laser diode.

In accordance with the teachings of the Pan reference the fiber optic cable is assembled into the module by initially placing the cable within the package adjacent to a laser diode. The laser diode is excited to direct a light beam through the fiber optic cable. The other end of the optic cable is coupled to a receiver unit which can determine the amount of optical power transmitted through the fiber.

The position of the fiber is varied until a predetermined optical power is detected by the receiver unit which corresponds to an optimal alignment position of the cable. The fiber is then removed from the package and the clip is placed on a package substrate. The fiber cable is re-inserted into the module and onto the clip at the optimal position. The cable is adjusted until a maximum optical power is detected to indicate alignment between the cable and the laser diode. The clip is then laser welded to the substrate. The fiber optic cable is once again adjusted until the cable is aligned with the diode. The ferrule of the cable is then laser welded to four corners of the clip.

It is desirable to minimize the amount of time required to align the fiber optic cable to the laser diode. Each second of assembly time increases the cost of mass producing the module. It would be desirable to reduce the time required to align the fiber optic cable with the laser diode. It would also be desirable to provide a clip that is conducive to a more efficient, automated, repeatable method for aligning the fiber cable with the laser diode.

The adjustment of the fiber during the alignment process is typically performed by an operator who manually moves the fiber. The adjustment of the fiber can occur both before and after a laser weld. Manually adjusting the fiber requires a certain level of skill and patience. It would be desirable to fully automate the adjustment process to minimize the skill and time required to align the fiber with the diode.

As discussed in the Pan reference the laser welding process creates local heating and shrinkage which can shift the position of the ferrule. The power and paths of the laser beams used to laser weld the ferrule to the clip can be adjusted to fine tune the position of the fiber optic cable. U.S. Pat. No. 4,747,657 issued to Chaoui et al. discloses a process for fine adjustment and alignment of a fiber optic cable subassembly with an optical device subassembly utilizing the shrinkage and shifting of the parts during the laser welding process. Such a technique is sometimes referred to as laser hammering.

In Chaoui the subassemblies are initially laser welded together at two opposite points of adjoining mating surfaces. Light is transmitted through the fiber and detected during the alignment process. An additional laser weld is then created adjacent to one of the initial weld locations. The shrinkage created by the additional weld spot will further shift the fiber cable toward the direction of the spot. Light transmitted through the fiber cable is then detected to determine whether there was an increase or decrease in light intensity. If the light intensity increased an additional weld spot is created adjacent to the two previous weld locations. If the light intensity decreases a weld spot is created adjacent to the other initial weld location. This iterative process continues until the fiber is aligned with the laser diode. As discussed in the Chaoui reference thirty-six weld spots may be required to align the fiber optic cable with the laser diode. This process may be time consuming and ultimately increase the cost of mass producing fiber modules. It would be desirable to provide an automated method to quickly align a fiber optic cable with a laser diode within a fiber module. It would also be desirable to predict and characterize any weld shifts and minimize the number of welds required to align the filter with the light.

SUMMARY OF THE INVENTION

A process for laser welding a ferrule of a fiber optic cable to a clip of a fiber module. The process can detect and correct a movement of the fiber optic cable so that the fiber is aligned with a light source such as a laser diode. The detection method includes the steps of mechanically moving the ferrule with an automated device after a weld is completed and then detecting a change in optical power of a light beam that is transmitted through the fiber optic cable. The detection can determine a direction that the ferrule shifted during the weld process. The shift of the ferrule can be corrected by subsequent laser welds of the ferrule and clip. The power and time duration of the laser welds can be determined from an empirically derived look-up table. The entire process of detection and correction can be automated.

DETAILED DESCRIPTION

Figure 1:
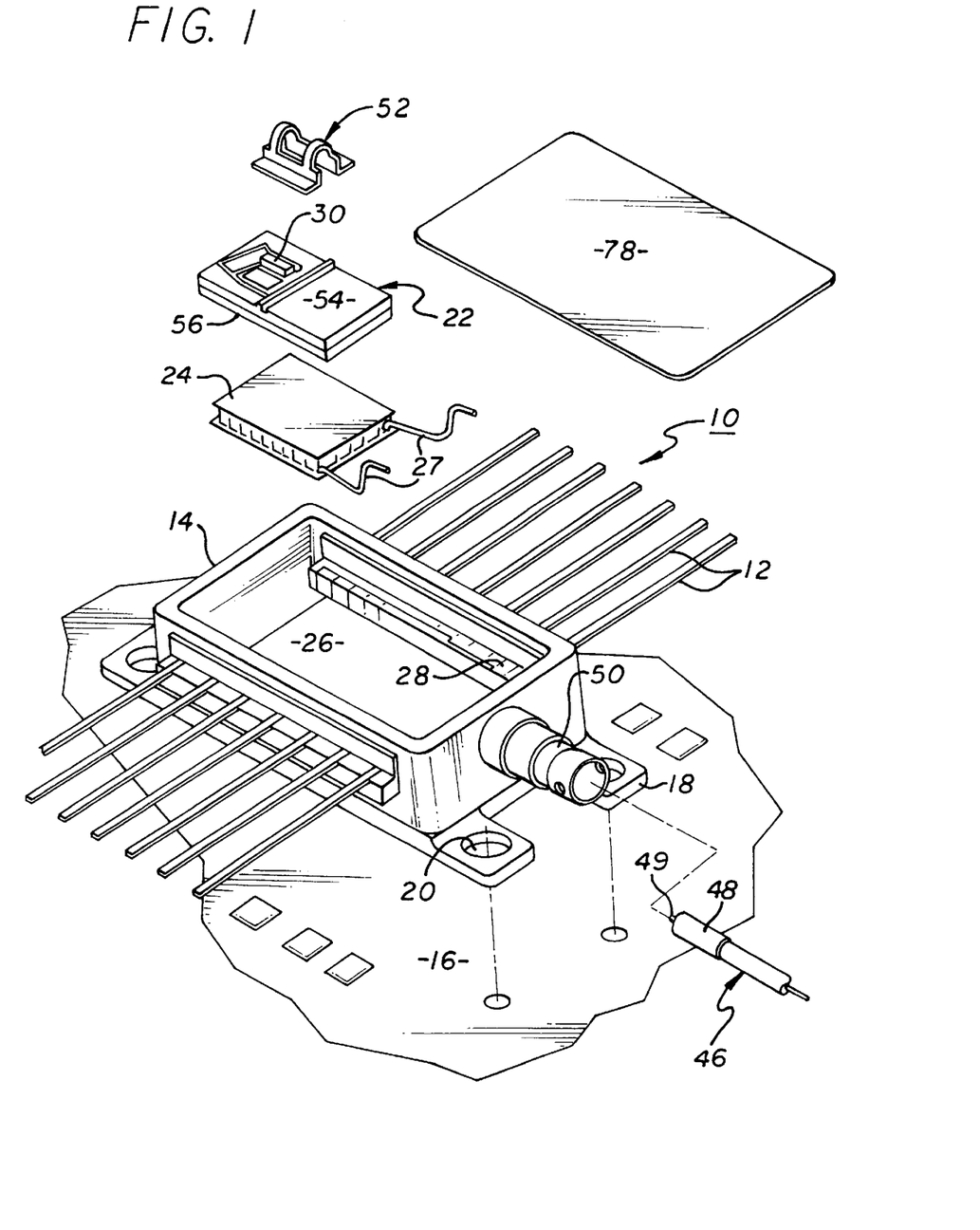
FIG. 1 is an exploded view of an embodiment of a fiber module of the present invention.

Referring to the drawings more particularly by reference numbers, FIG. 1 shows an embodiment of a fiber module 10 of the present invention. The module 10 may include a plurality of electrical leads 12 that extend from a package housing 14. The leads 12 are typically bent into a gull-wing configuration and soldered to a printed circuit board assembly 16. The package housing 14 may include a number of flanges 18 which have openings 20 that allow the module 10 to be mounted to the printed circuit board assembly 16 with fasteners (not shown) such as screws. The printed circuit board assembly 16 typically contains driver amplifiers and other electronic circuits that are connected to the module 10.

The module 10 may include an optical subassembly 22 that is mounted to a cooling element 24. The cooling element 24 may be mounted to a base surface 26 of the package housing 14. The cooling element 24 may be an electronic device such as a Peltier element which removes heat generated by the optical subassembly 22. The cooling element 24 may have leads 27 that are connected to electrical bond pads 28 of the package housing 14. By way of example, the housing 14 may be constructed from ceramic material with a co-fired process commonly used to construct integrated circuit packages.

Figure 2:
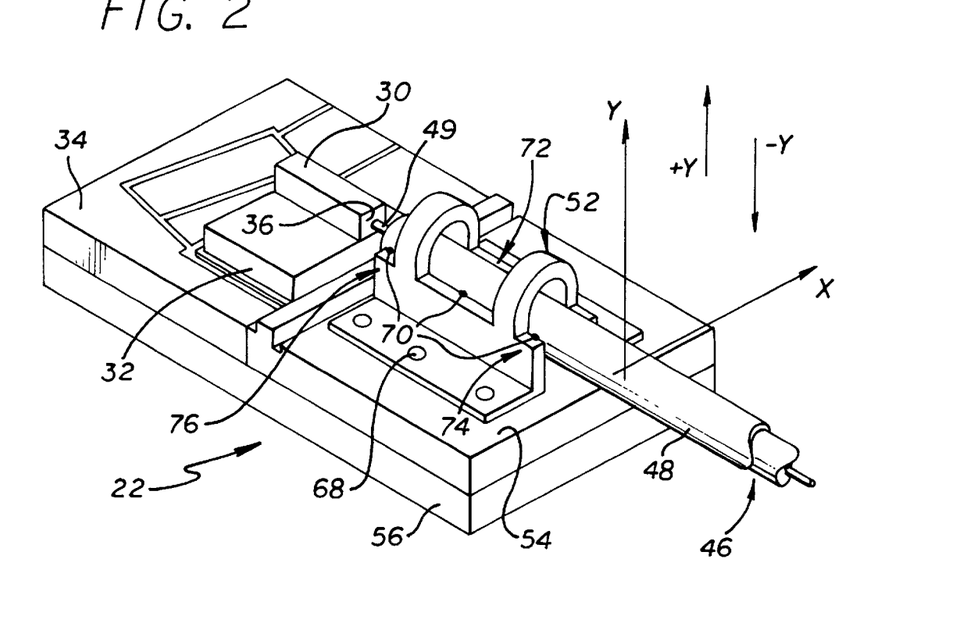
FIG. 2 is a perspective view of the fiber module.

As shown in FIG. 2, The optical subassembly 22 may include a laser diode 30 that emits a beam of light (not shown). The laser diode 30 may be mounted to a diode substrate 32 which is attached to a circuit platform 34. The platform 34 may be connected to the bond pads 28 of the package housing 14 with bond wires, TAB tape or other means of interconnection known in the art.

The laser diode 30 is optically coupled to a fiber optic cable 46 that is surrounded by a ferrule 48. The distal end of the fiber cable 46 may have a microlens 49 to focus the light emitted by the diode 30 into the cable 46. Referring to FIG. 1, the ferrule 48 and cable 46 extend into the module 10 through a snout 50 in the package housing 14. The ferrule 48 can be soldered to the housing 14 with a solder preform 51.

It is desirable to align the laser diode 30 with the fiber optic cable 46 to minimize the optical coupling losses in the light emitted by the diode 30 and transmitted through the cable 46. The module 10 may include a clip 52 to align the fiber optic cable 46 with the laser diode 30. The clip 52 may be attached to a platform 54. The clip platform 54 and circuit platform 34 may be mounted to a base plate 56 that is attached to the cooling element 24.

Figure 3:
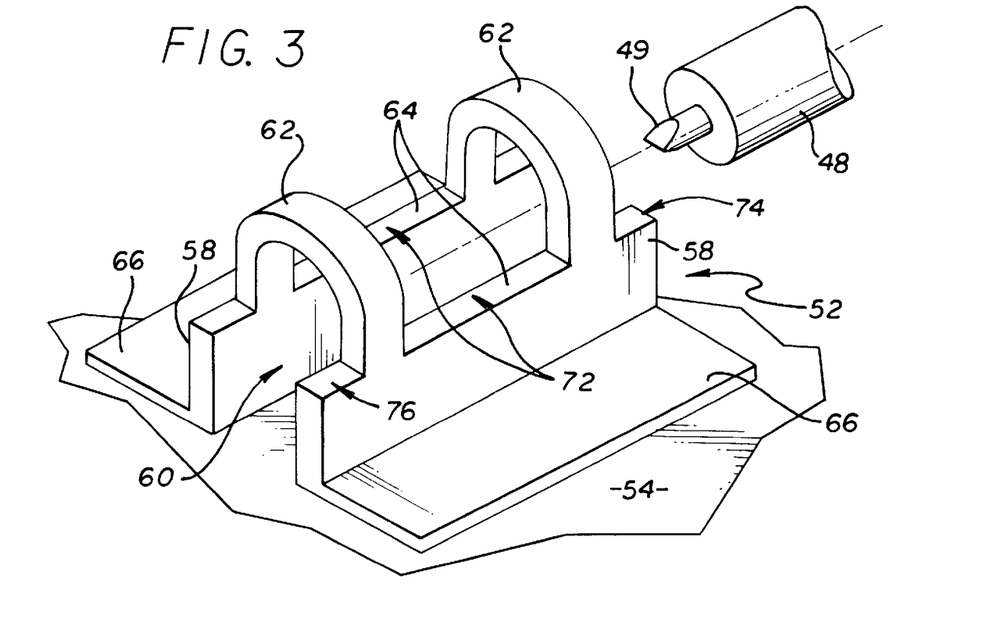
FIG. 3 is an exploded view showing a clip and a fiber optic cable of the module.

As shown in FIG. 3, the clip 52 may include a pair of sidewalls 58 that are separated by a channel 60. The channel 60 preferably has a width that is approximately equal to the diameter of the fiber optic cable ferrule 48 so that the ferrule 48 can be laser welded to the sidewalls 58. The sidewalls 58 are joined by a pair of joining segments 62.

The joining segments 62 may be shaped as a segment of a circle so that at least a portion of the ferrule 48 may extend beyond the top surface 64 of the sidewalls 58. The distance between the bottom surface of the joining segments 62 and the platform 54 should be greater than the diameter of the fiber cable ferrule 48 so that the ferrule 48 can be vertically adjusted within the clip 52.

The clip 52 may have a pair of flanges 66 that extend from the sidewalls 58 and are attached to the platform 54 at weld locations 68. The ferrule 48 may be laser welded to the clip 52 at weld locations 70.

The joining segments 62 may be separated from each other by a space so that the clip 52 and ferrule 48 can be welded together at a center location, generally designated 72. Furthermore, the joining segments 62 may be offset from opposite ends of the clip 52 to allow welding at proximal and distal end locations generally designated 74 and 76, respectively.

It is desirable to construct the clip 52 and platform 54 from the same material as the ferrule 48 to minimize the differential thermal expansion between the parts 48, 52 and 54 when the components are heated, and subsequently cooled, during the laser weld process. By way of example, the ferrule 48, clip 52 and platform 54 may all be constructed from an iron-nickel-cobalt alloy commonly referred to as KOVAR. Referring to FIG. 1, the optical subassembly 22, clip 52 and distal end of the fiber optic cable 46 are typically hermetically sealed within the package housing 14 with a lid 78.

Figure 4:
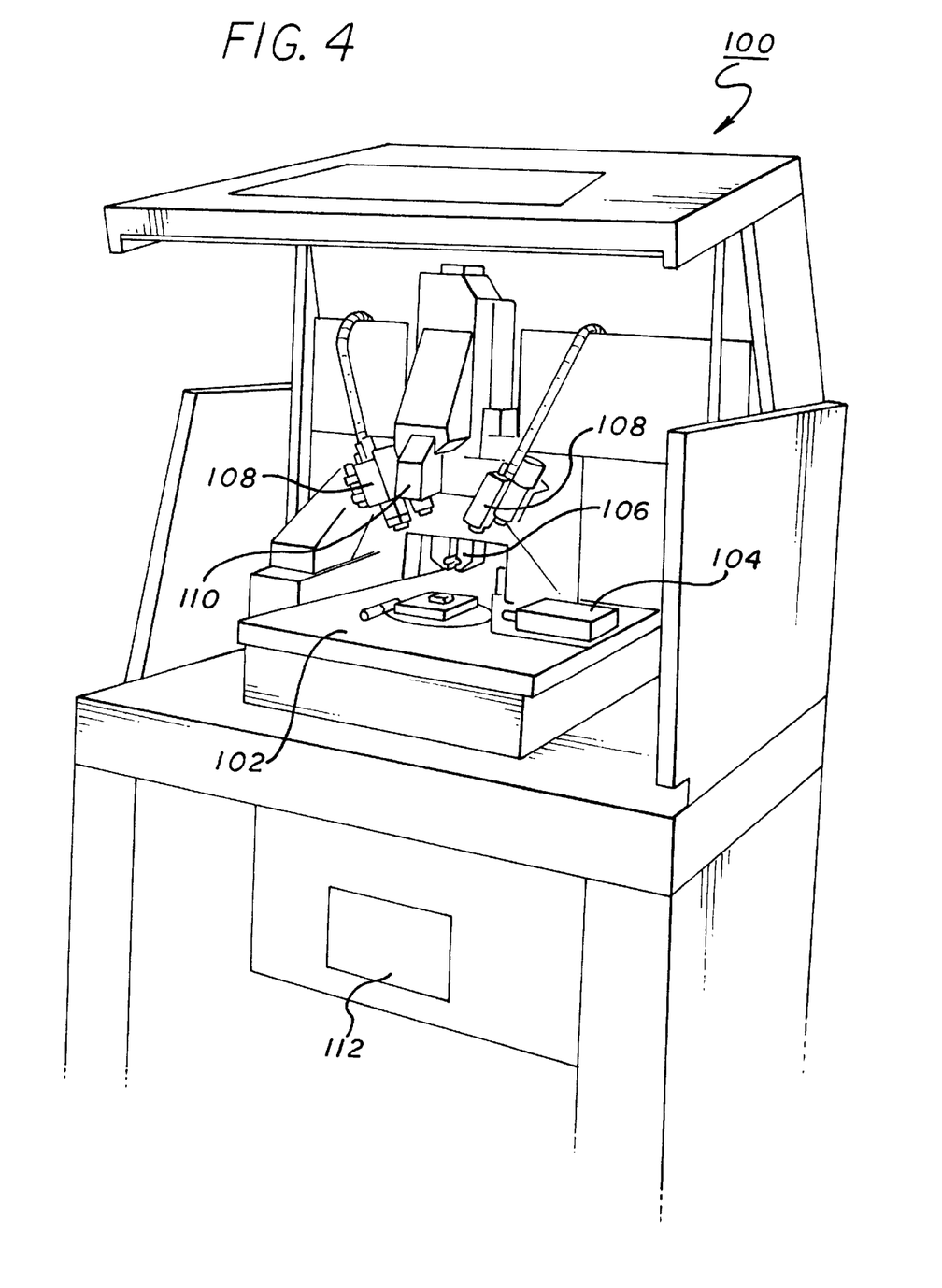
FIG. 4 is a perspective view showing a laser weld machine used to weld the module.

FIG. 4 shows a laser weld machine 100 that can be used to align a fiber optic cable with a laser diode and weld a clip to both a ferrule and a platform of a fiber module. The machine 100 may include a table 102 to support a fiber module during assembly. The table 102 may be an x-y table that can move the module within a spatial plane. The machine 100 may further include an automated fiber loader 104 that can insert the fiber through the snout of the package housing and an articulate gripper 106 that can grasp and move the ferrule within the package housing 14. The machine 100 may also have a vacuum pencil (not shown) that loads a clip into the module.

The machine 100 may have a pair of laser welding units 108 which each emit a beam of light to laser weld the module. Cameras 110 may be mounted to the lasers 108 and connected to a monitor (not shown) to allow an operator to view the laser welding sites.

The machine 100 may have a tester unit (not shown) that is used to align the fiber to the laser diode. The tester unit may include a driver circuit which excites the laser diode within the module to emit a light beam that is transmitted through the fiber optic cable. The tester unit may also have a detector which can detect the light transmitted through the fiber cable.

The gripper 106, lasers 108 and tester unit may all be connected to a computer 112. The computer 112 may perform a software routine that aligns the fiber optic cable with the laser diode by laser welding the clip to the ferrule. The computer 112 may include a keypad (not shown) which allows an operator to vary different parameters of the process.

Figure 5A:
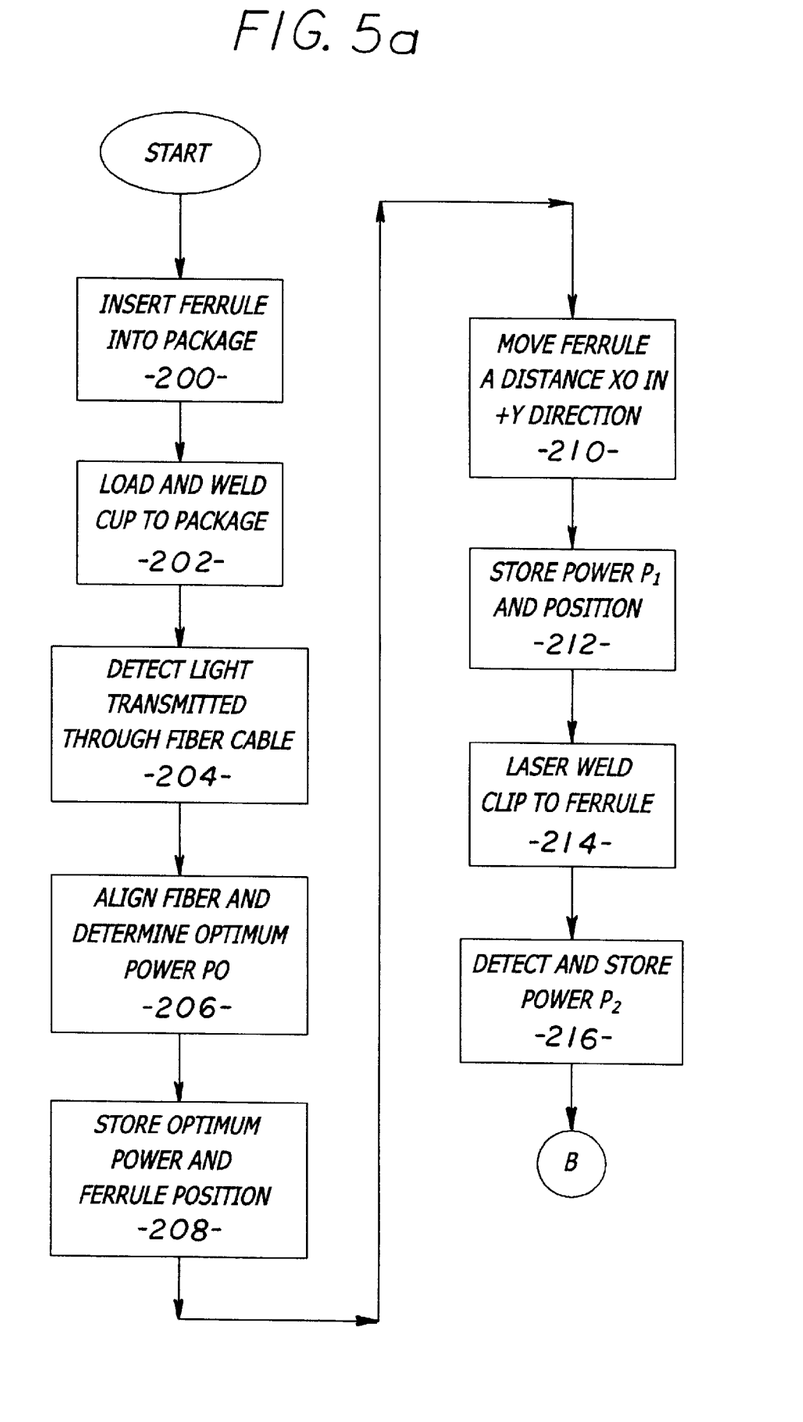
FIGS. 5a–b are a flowchart which describes a method for aligning a fiber optic cable with a laser diode of the fiber module.
Figure 5B:
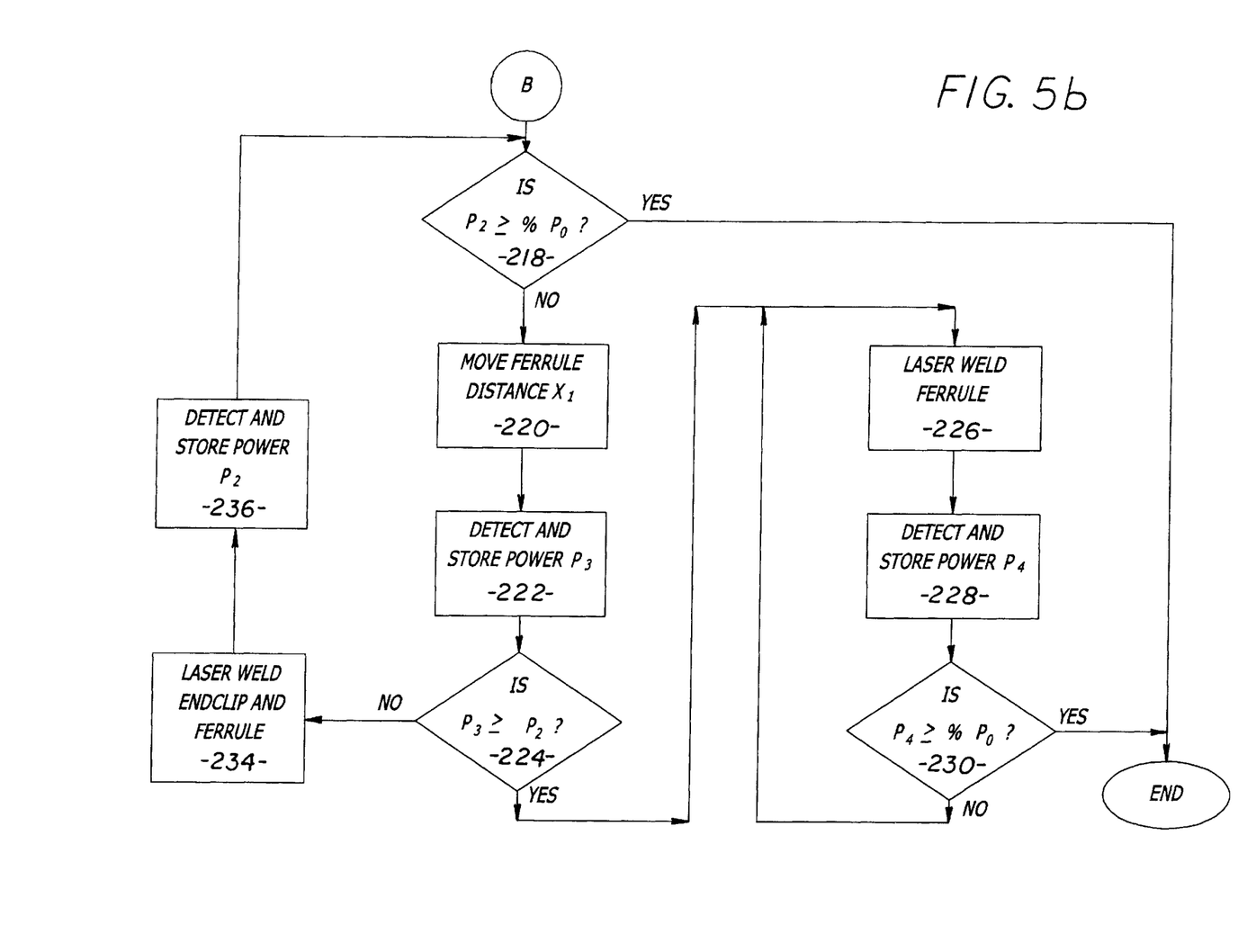

FIGS. 5a–b show a process for automatically aligning the fiber optic cable with the laser diode. The process can be performed in accordance with a software routine executed by the computer of the laser weld machine. The ferrule and fiber optic cable are initially inserted through the snout of the package housing with the loader in process step 200. In step 202 the clip is loaded into the package housing with the vacuum pencil. The configuration of the module clip allows the clip to be loaded into the module without moving the fiber optic cable.

The test unit is activated to emit and detect light transmitted through the fiber cable in step 204. This step may be performed before step 202. In step 206 the gripper moves the ferrule until an optimum power of light transmitted through the fiber is detected. The value of the optimum power P0 and the corresponding position of the fiber cable are stored in memory in step 208.

Laser welding creates local melting and shrinkage in the clip and ferrule. The shrinkage causes the ferrule to move toward the platform along the Y axis shown in FIG. 2. Referring to FIG. 5a, in step 210 the gripper may move the ferrule in the +Y direction a distance X0 which approximates the amount of anticipated shrinkage. The anticipated shrinkage may be predetermined from empirical data. The power of light P1 detected by the test unit at the new position is stored with the corresponding position of the fiber cable in step 212. The distance X0 may actually be different from the anticipated shrinkage to insure that the fiber optical cable does not move past the desired position. The laser weld machine welds the clip to the platform and the ferrule to the clip in step 214.

Figure 6:
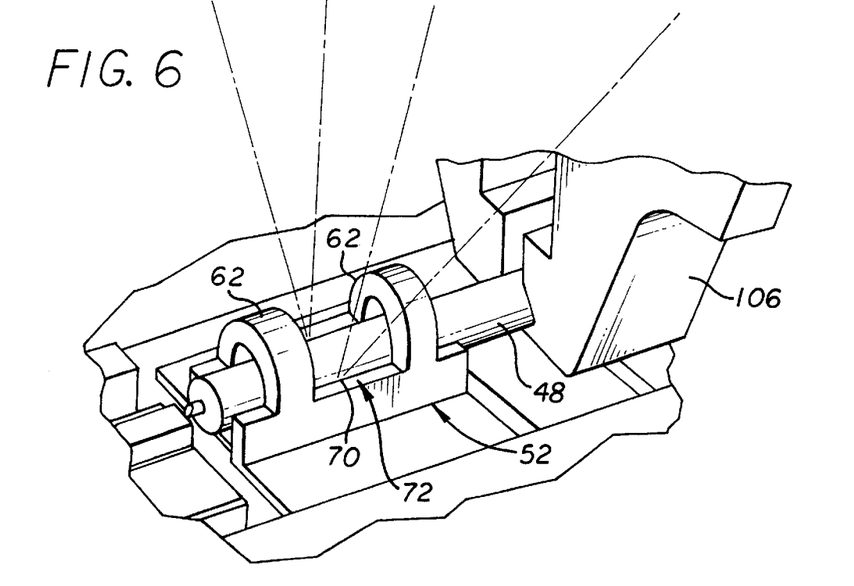
FIG. 6 is a perspective view showing a ferrule of the fiber optic cable being laser welded to a clip of the module at a center location of the clip.

As shown in FIG. 6 the initial weld spots attach the ferrule 48 to the sidewalls 58 at a center location 72 of the clip 52. The joining segments 62 are separated with a space sufficient to allow passage of the laser welding beams to the center location 72. The joining segments 62 also limit the center weld location of the clip to the space between the segments 62.

Referring again to the flowchart shown in FIG. 5a, the optical power P2 of the light transmitted through the fiber after the initial laser weld is detected and stored in step 216. The value P2 is compared with a percentage of P0 in decision block 218. If P2 is equal to or greater than the percentage of P0 then the process ends. By way example, if P2 equals 95% of P0 then the weld process will terminate.

If P2 is less than the percentage of P0 then the gripper moves the ferrule in a pre-programmed direction a distance X1 in step 220. By way of example, the ferrule may be moved in the −Y direction. It is desirable to move the ferrule in the elastic region of the ferrule/clip subassembly to prevent permanent deformation. The power of detected light P3 after the fiber cable has been moved X1 is stored in step 222. P3 is compared with P2 in decision block 224. If P3 is greater than P2 then the laser weld machine will again weld the ferrule and clip at the center location in step 226. The subsequent welds in the center location are preferably at a location different from the previous center weld spots.

Figure 7:
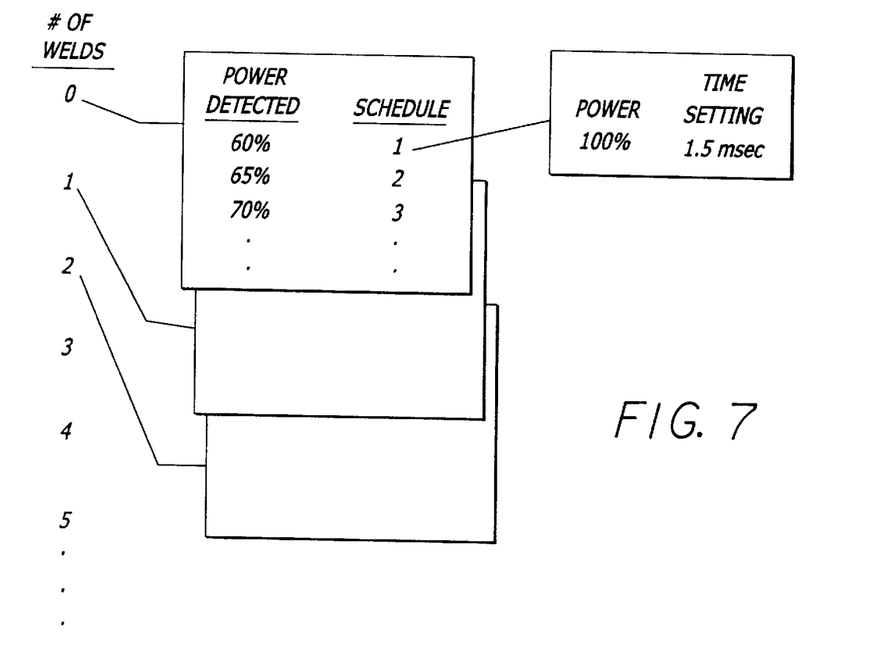
FIG. 7 is a schematic of a look-up table.

The power and time duration of the laser welds will be determined from a look up table schematically shown in FIG. 7. The look-up table may contain a number of laser weld schedules which each contain an empirically derived laser power settings and an empirically derived weld time duration and/or location. The schedule to be used by the laser weld machine depends upon the value of the detected optical power and the number of welds that presently exist. For example, after the initial weld the value P2 may be 0.0006 watts ("W") which is 60% of the optimum power P0. Based on the look-up table the laser weld machine will perform the laser weld of step 226 based on schedule 1.

Each schedule may have a different combination of laser welding power settings and time durations. Each associated set of detected optical powers and number of existing welds will have a corresponding schedule. The schedules may vary for each weld location. For example, the schedules for the center welds may be different than the schedules for the end welds. Likewise, the schedules for the proximal end welds may be different than the schedules for the distal end welds. Although empirical data is described, it is to be understood that analytical data may be used to determine the power and time durations. Additionally, instead of a look-up table an equation(s) can be used to determine the power and time durations for the laser welds.

Referring to FIG. 5b, after the second weld the power of light P4 transmitted through the fiber is detected and stored in step 228. P4 is compared with the percentage of P0 in decision block 230. If P4 is at least equal to the percentage of P0 the process is terminated.

Figure 8:
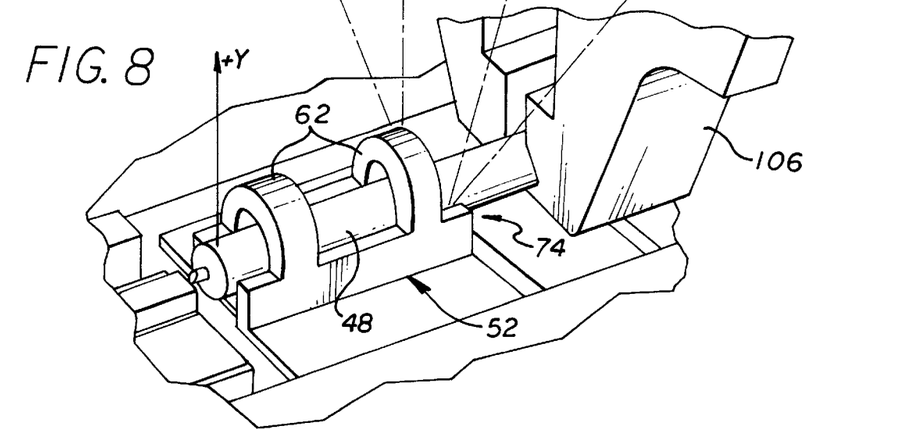
FIG. 8 is a perspective view similar to FIG. 6 showing laser welds at a proximal end of the clip.

If in step 224 it is determined that P3 is less than P2 then the laser weld machine will weld the ferrule and clip at a proximal end of the clip in step 234. The power and time duration of the weld is again determined from the empirically derived look-up table. Referring to FIG. 8 the shrinkage created by the welds at the end of the clip will induce a pivoting movement of the ferrule and cause the distal end of the fiber to move in a +Y direction.

Figure 9:
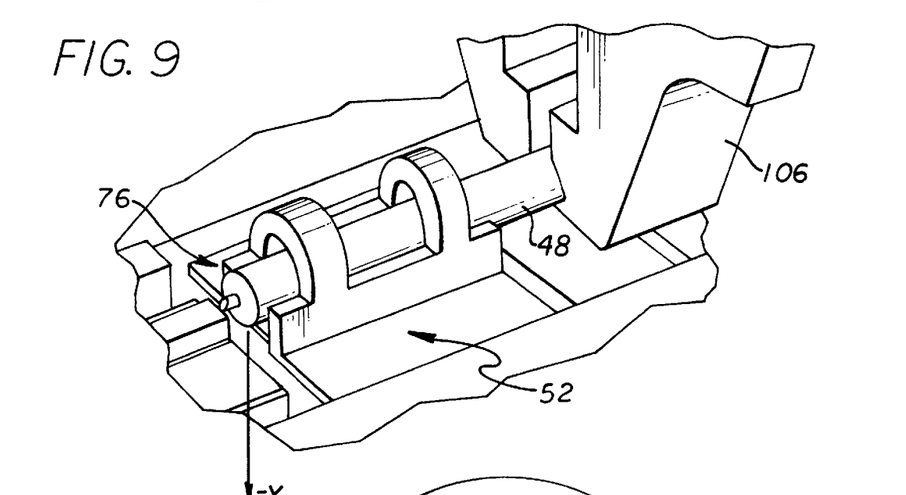
FIG. 9 is a perspective view similar to FIG. 8 showing laser welds at a distal end of the clip.

Referring to FIG. 5a, the value of the detected light is stored in step 234 as P2 and the process returns to step 218. The process of steps 218–232 are repeated until P3 is again less than P2. The laser weld machine then welds the ferrule and clip at the distal end of the clip in step 236. Referring to FIG. 9 the shrinkage created by the welds at the end of the clip 52 will cause the distal end of the fiber to move in a −Y direction. Referring to FIG. 5b, The process returns to step 218 and remains in this loop until P3 is equal to or greater than a percentage of P0.

Figure 10:
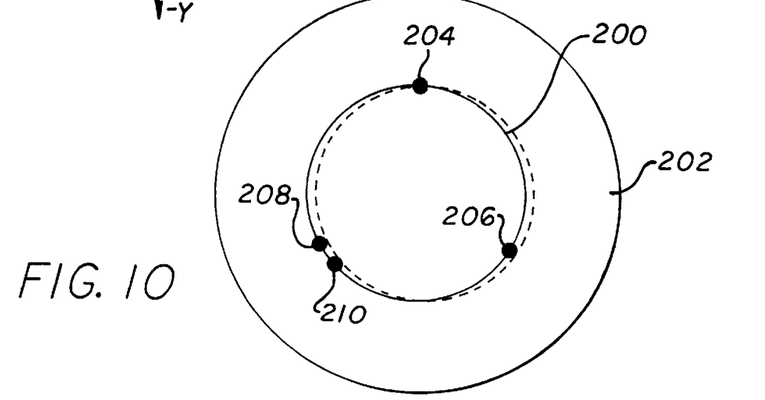
FIG. 10 is an end view showing a ferrule soldered to a fiber module barrel.

Although a laser weld detection and correction process has been shown with respect to the clip shown in FIGS. 6, 8 and 9, it is to be understood that the detection and correction technique of the present invention can be used on other configurations. For example FIG. 10 shows a ferrule 200 welded to a clip or barrel 202 at three different points about the perimeter of the ferrule 200. In this process the ferrule 200 may be placed in an optimum position and welded to the clip at three equal distance weld spots 204, 206 and 208. The weld process may cause a shift in the ferrule 200 to a less than optimum position. The detection and correction technique of the present invention can be utilized to laser hammer the ferrule back to a desired position.

Using the laser weld machine shown in FIG. 4, the gripper may move the ferrule and the test unit may detect the corresponding optical power to determine the direction of shift created by the initial weld. The laser weld machine may then create a subsequent weld or welds 210 to move the ferrule back toward the original optimum position. One or two lasers may be turned off for the subsequent welds. The power and time duration of each laser, and the determination of which lasers to turn off, can be determined with an empirically derived look-up table or equation(s). The process of welding and detecting the optical power is repeated until the ferrule is moved into a desired position.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although a laser diode is shown and described, it is to be understood that the module may contain any optical element such as a light emitting diode (LED), an optical detector or a modulator. Additionally, the alignment method shown and described can be used to align any two components.

Although methods using laser hammering have been described, it is to be understood that the position of the ferrule may be adjusted mechanically during any of the process. The position of the ferrule after a weld may be adjusted mechanically by the gripper.

Figure 11:
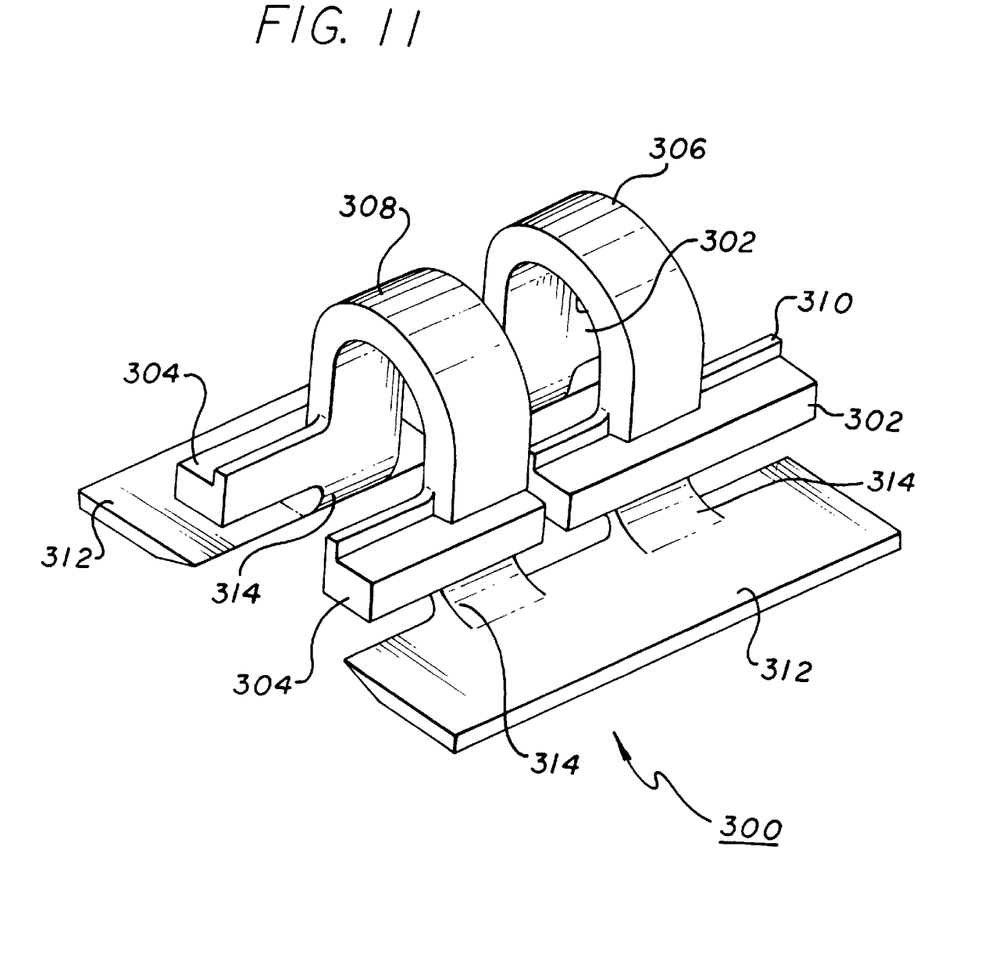
FIG. 11 is a perspective view of an alternate embodiment of the clip.

FIG. 11 shows an alternate embodiment of a clip 300 which can be mechanically plastically deformed. The plastically deformable clip 300 is more conducive to mechanical adjustment of the fiber ferrule. By way of example, the clip 300 may be plastically deformed by the mechanical gripper shown in FIG. 6.

The clip 300 may have two sets of sidewalls 302 and 304 that are connected by a pair of joining segments 306 and 308, respectively. The sidewalls 302 and 304 may each have narrow ledge portions 310 which can be welded to a fiber ferrule (not shown).

The sidewalls 302 and 304 may be coupled to a pair of support flanges 312 by neck portions 314. The neck portions 314 reduce the stiffness between the sidewalls 302 and 304 and the support flanges 312 so that the adjoining ferrule (not shown) can be moved in a downward direction when a corresponding mechanical force is applied to the top surface of the joining segment(s) 306 and/or 308. Each neck portion 314 may have a curvature to further reduce the stiffness of the clip 300 and the force required to move the ferrule in a downward direction.

The sidewalls of the first set 302 are separated from the sidewalls of the second set 304 to further reduce the stiffness of the clip 300. The separated sets of sidewalls also allows one set of sidewalls 302 or 304 to be moved relative to the other set of sidewalls 302 or 304. For example, the sidewalls 302 may be moved in a downward direction a greater distance than the sidewalls 304 to tilt the ferrule.

What is claimed is:

1. A method for detecting a movement of a fiber optic cable which has a ferrule that is welded to a support member and is coupled to an optical element, comprising:

determining a first value of a characteristic of a light beam that travels between the fiber optic cable and the optical element;

welding the ferrule to the support member with a laser wherein the fiber optic cable moves relative to a reference surface;

moving the ferrule with an automated device wherein the light beam characteristic has a second value;

detecting the second value of the light beam characteristic; and, comparing the second value with the first value to determine the movement caused by the welding of the ferrule to the support member.

2. The method of claim 1, wherein the characteristic is a function of an optical coupling between the fiber optic cable and the optical element.

3. The method of claim 1, wherein the characteristic is optical power.

4. The method of claim 1, wherein a direction of movement is determined by comparing the second value with the first value.

5. A method for detecting and correcting a movement of a fiber optic cable which has a ferrule that is welded to a support member and is coupled to an optical element, comprising:

determining a first value of a characteristic of a light beam that travels between the fiber optic cable and the optical element;

welding the ferrule to the support member with a laser wherein the fiber optic cable moves relative to a reference surface;

moving the ferrule with an automated device wherein the light beam characteristic has a second value;

detecting the second value of the light beam characteristic; and, comparing the second value with the first value to determine the movement caused by the welding of the ferrule to the support member; and, moving the ferrule relative to the reference surface.

6. The method of claim 5, wherein the light beam characteristic is optical power.

7. The method of claim 5, wherein a direction of movement is determined by comparing the second value with the first value.

8. The method of claim 5, wherein the ferrule is moved by further welding the ferrule to the support member.

9. The method of claim 5, wherein the ferrule is moved with a mechanical device.

10. The method of claim 5, wherein at least one laser weld parameter is determined from one of a plurality of schedules.

11. The method of claim 10, wherein each schedule includes a power parameter and a time duration parameter.

12. The method of claim 11, wherein the power and time duration parameters are empirically derived.

13. A method for welding a ferrule of a fiber optic cable to a clip, comprising:

placing the ferrule adjacent to the clip;

welding the ferrule to the clip with a laser at a first center location of the clip; and, welding the ferrule to the clip with the laser at a first end location of the clip.

14. The method of claim 13, further comprising the step of welding the ferrule to the clip at a second end location of the clip.

15. The method of claim 13, further comprising the steps of determining a first value of a characteristic of a light beam that travels between the fiber optic cable and an optical element that is coupled to the fiber optic cable.

16. The method of claim 15, further comprising the step of moving the fiber optic cable before welding the ferrule to the clip at first center location.

17. The method of claim 15, further comprising the steps of moving the fiber optic cable, detecting a second value in the light beam characteristic, comparing the second value with the first value to determine the movement caused by the welding of the ferrule to the support member, welding the ferrule and the support member with the laser at a second center location of the clip to induce a further movement of the fiber optic cable, before welding at the first end location of the clip.

18. The method of claim 13, wherein at least one laser weld parameter is determined from one of a plurality of schedules.

19. The method of claim 18, wherein each schedule includes a power parameter and a time duration parameter.

20. The method of claim 19, wherein the power and time duration parameters are empirically derived.

21. A method for laser welding a ferrule of a fiber optic cable to a support member, comprising:

detecting an optical power of a light beam emitted from the fiber optic cable;

determining at least one laser weld parameter from one of a plurality of schedules based on the detected optical power;

attaching the ferrule to the support member; and, welding the ferrule to the support member using the laser weld parameter.

22. The method of claim 21, wherein the schedule includes a power parameter and time duration parameter.

23. The method of claim 22, wherein the power and time duration parameters are emperically derived.

24. A method for laser welding a ferrule of a fiber optic cable to a support member, comprising:
welding the ferrule to the support member using at least one first weld parameter;
detecting an optical power of a light beam emitted from the fiber optic cable; and,
welding the ferrule to the support member using at least one second weld parameter based on the detected optical power.

25. The method of claim 24, wherein said first and second weld parameters are determined from one of a plurality of schedules.

26. The method of claim 24, wherein the selected schedule is a function of a number of existing welds.

27. The method of claim 24, wherein the weld parameters include a power parameter and a time duration parameter.

28. The method of claim 27, wherein the power and time duration parameters are emperically derived.

* * * * *